(12) United States Patent
Fox

(10) Patent No.: US 6,185,438 B1
(45) Date of Patent: Feb. 6, 2001

(54) PROCESSOR USING VIRTUAL ARRAY OF BUFFER DESCRIPTORS AND METHOD OF OPERATION

(75) Inventor: Robert G. Fox, Richardson, TX (US)

(73) Assignee: Samsung Electronics Co., Ltd. (KR)

( * ) Notice: Under 35 U.S.C. 154(b), the term of this patent shall be extended for 0 days.

(21) Appl. No.: 09/165,044

(22) Filed: Oct. 1, 1998

(51) Int. Cl.[7] ........................................... H04Q 7/30
(52) U.S. Cl. ............................. 455/560; 455/73
(58) Field of Search ...................... 455/419, 560, 455/561, 423, 424, 67.1, 73

(56) References Cited

U.S. PATENT DOCUMENTS 5,926,757 * 7/1999 Luijten ................................. 455/422
5,966,655 * 10/1999 Hardouin ............................. 455/418
6,094,585 * 7/2000 Dajer .................................... 455/522

* cited by examiner

Primary Examiner—Daniel S. Hunter
Assistant Examiner—Nick Corsaro
(74) Attorney, Agent, or Firm—John C. Han

(57) ABSTRACT

A communication processor that uses a group of hardware buffer descriptors and a virtual array of buffer descriptors to control the communication ports of the communication processor. The virtual array of buffer descriptors is a data structure stored in a local memory that contains data fields that are similar to the hardware buffer descriptors of the communication processor. The processor swaps data between the hardware buffer descriptors and the virtual array of buffer descriptors to provide "just in time" storage of control and status information used by the communication ports to transmit and receive data.

20 Claims, 5 Drawing Sheets

PROCESSOR USING VIRTUAL ARRAY OF BUFFER DESCRIPTORS AND METHOD OF OPERATION

TECHNICAL FIELD OF THE INVENTION

The present invention is directed, in general, to wireless communication networks and, more specifically, to a processor that uses a virtual buffer descriptor array to control communication ports of the processor.

BACKGROUND OF THE INVENTION

Reliable predictions indicate that there will be over 300 million cellular phone customers by the year 2000. In the U.S., cellular service is offered not only by dedicated cellular service providers, but also by the regional Bell companies, such as U.S. West, Bell Atlantic and Southwestern Bell, and the national long distance companies, such as AT&T and Sprint. The enhanced competition has driven the price of cellular service down to the point where it is affordable to a large segment of the population.

Wireless subscribers use a wide variety of wireless devices, including cellular phones, personal communication services (PCS) devices, and wireless modem-equipped personal computer (PCs), among others. The large number of subscribers and the many applications for wireless communications have created a heavy subscriber demand for RF bandwidth. To maximize usage of the available bandwidth, a number of multiple access technologies have been implemented to allow more than one subscriber to communicate simultaneously with each base transceiver station (BTS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

To further maximize frequency reuse, wireless carriers frequently implement smaller cells, sometimes referred to as "microcells" or "picocells." The base transceiver station in a microcell (or picocell) broadcasts at relatively lower power over a smaller geographical regions, so that cells may be packed tighter together. This requires a greater amount of infrastructure equipment, but a greater number of subscribers to be serviced by the entire wireless network.

A base transceiver station in a wireless network contains numerous standard-commodity digital processors, such as the MPC860 PowerQUICC™ from Motorola, that process the calls being handled by the base transceiver station. The digital processors establish, maintain, and terminate wireless connections between mobile stations (i.e., cell phones, PCS devices, wireless PCs, pagers, etc.) used by subscribers and the wireless network. The digital processors contain hardware communication ports that are used in the process of transmitting and receiving data in the base transceiver station. The communication ports are in turn controlled by internal registers, called buffer descriptors, which set up the communication ports. These registers form a buffer descriptor array that may be used to store status and control information about the communication ports and the data being communicated.

The status and control information is used for both the transmission and the reception of data. This status and control information includes 1) the starting address of the data buffer holding the needed data, 2) the length of the data in the data buffer and 3) bits that may be used to activate and deactivate the digital processor or to indicate certain conditions, including errors.

However, the architecture of digital processors provide only a relatively limited number of registers to be used as buffer descriptors. Since the buffer descriptors are used to control communication ports, and the communication ports control the number of calls handled by the base transceiver station, any limitation on the size of the buffer descriptor array also limits the throughput of the base transceiver station. If the transmitter buffer descriptors of a digital processor are filled when additional data packets are available for processing and transmission, the additional packet processing must wait until a transmitter buffer descriptor becomes available to store them. On the receiver side, if the receiver buffer descriptors are waiting to transfer data to the transmitter buffer descriptors while the transmitter buffer descriptors are unavailable, then incoming data to the receiver is lost because there are no registers in which to store the newly received data.

There is therefore a need in the art for improved transceiver systems for use in wireless networks. In particular, there is a need for communications systems that are not limited by the hardware design of commercially available communications processors. More particularly, there is a need for communications systems that are able to expand the call handling capabilities of communications processors.

SUMMARY OF THE INVENTION

To address the above-discussed deficiencies of the prior art, it is a primary object of the present invention to provide, for use in a communications device, a transceiver controller that uses hardware buffer descriptors and a virtual array of buffer descriptors to control the communication ports of a communication processor. The virtual array of buffer descriptors is a data structure comprising data fields that is similar to the hardware buffer descriptors of the communication processor and provides "just in time" storage of control and status information used by the communication ports of the communication processor to transmit and receive data. An interrupt controller detects a full condition in the hardware receiver buffer descriptors and loads the contents of the hardware receiver buffer descriptors into a receiver virtual array of buffer descriptors with as many buffer descriptors as needed. After the receiver virtual array of buffer descriptors is loaded, the hardware receiver buffer descriptor is initialized to received more data.

With respect to transmitter functions, the communication processor, under control of application software, takes outbound data from a receiver port or from other data sources in, or connected to, the transceiver controller and fills the transmitter virtual array of buffer descriptors and sets the proper control bits. An interrupt controller detects an emptiness condition, or is triggered by a timer, and moves the contents of the transmitter virtual array of buffer descriptors to the hardware transmitter buffer descriptors. The transmitter virtual array of buffer descriptors is cleared and control bits are reset to allow incoming data to be stored in the transmitter virtual array of buffer descriptors.

Accordingly, in one embodiment of the present invention, there is provided, for use in a communications network, a communications controller capable of transmitting outbound data to a receiving node and receiving incoming data from a transmitting node comprising: 1) a processor comprising: a) a plurality of transmit buffer descriptors, each of the plurality of transmit buffer descriptors comprising at least one register capable of storing transmit configuration information used by the processor to control a transmission of the outbound data; and b) a plurality of receive buffer descriptors, each of the plurality of receive buffer descriptors comprising at least one register capable of storing receive configuration information used by the processor to control a reception of the incoming data; and 2) a memory coupled to the processor and capable of storing the transmit configuration information in a virtual transmit buffer descriptors array and storing the receive configuration information in a virtual receive buffer descriptors array, wherein the processor transfers the receive configuration information from at least one of the plurality of receive buffer descriptors to the virtual receive buffer descriptors array when the plurality of receive buffer descriptors are full.

According to another embodiment of the present invention, the processor transfers the transmit configuration information from the virtual transmit buffer descriptors array to at least one of the plurality of transmit buffer descriptors when the plurality of transmit buffer descriptors are available.

According to yet another embodiment of the present invention, the processor further comprises a plurality of receiver ports capable of receiving the incoming data.

According to still another embodiment of the present invention, the processor uses the receive configuration data to control an operation of at least one of the plurality of receiver ports.

According to a further embodiment of the present invention, the processor further comprises a plurality of transmitter ports capable of transmitting the outbound data.

According to a still further embodiment of the present invention, the processor uses the transmit configuration data to control an operation of at least one of the plurality of transmit ports.

According to a yet further embodiment of the present invention, the virtual transmit buffer descriptors array comprises a high priority virtual transmit buffer descriptors array capable of storing transmit configuration data associated with high priority outbound data and a low priority virtual transmit buffer descriptors array capable of storing transmit configuration data associated with low priority outbound data.

According to another embodiment of the present invention, the virtual receive buffer descriptors array comprises a high priority virtual receive buffer descriptors array capable of storing receive configuration data associated with high priority incoming data and a low priority virtual receive buffer descriptors array capable of storing receive configuration data associated with low priority incoming data.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged communications network.

The following descriptions of the present invention disclose a specific embodiment in which a communication processor in accordance with the principles of the present invention is incorporated into BTS controller in a wireless network. Those skilled in the art will understand that this is by way of example only and should not be construed to limit the types of devices in which the present invention may be implemented. In fact, a communication processor operating in conjunction with a virtual array of buffer descriptors may be implemented in a wide variety of both wireless and wireline communication systems, including switches, routers, bridges, concentrators, and the like. Those skilled in the art will be able to modify the specific embodiments disclosed herein in order to implement the present invention in those other types of communication equipment.

Figure 1:
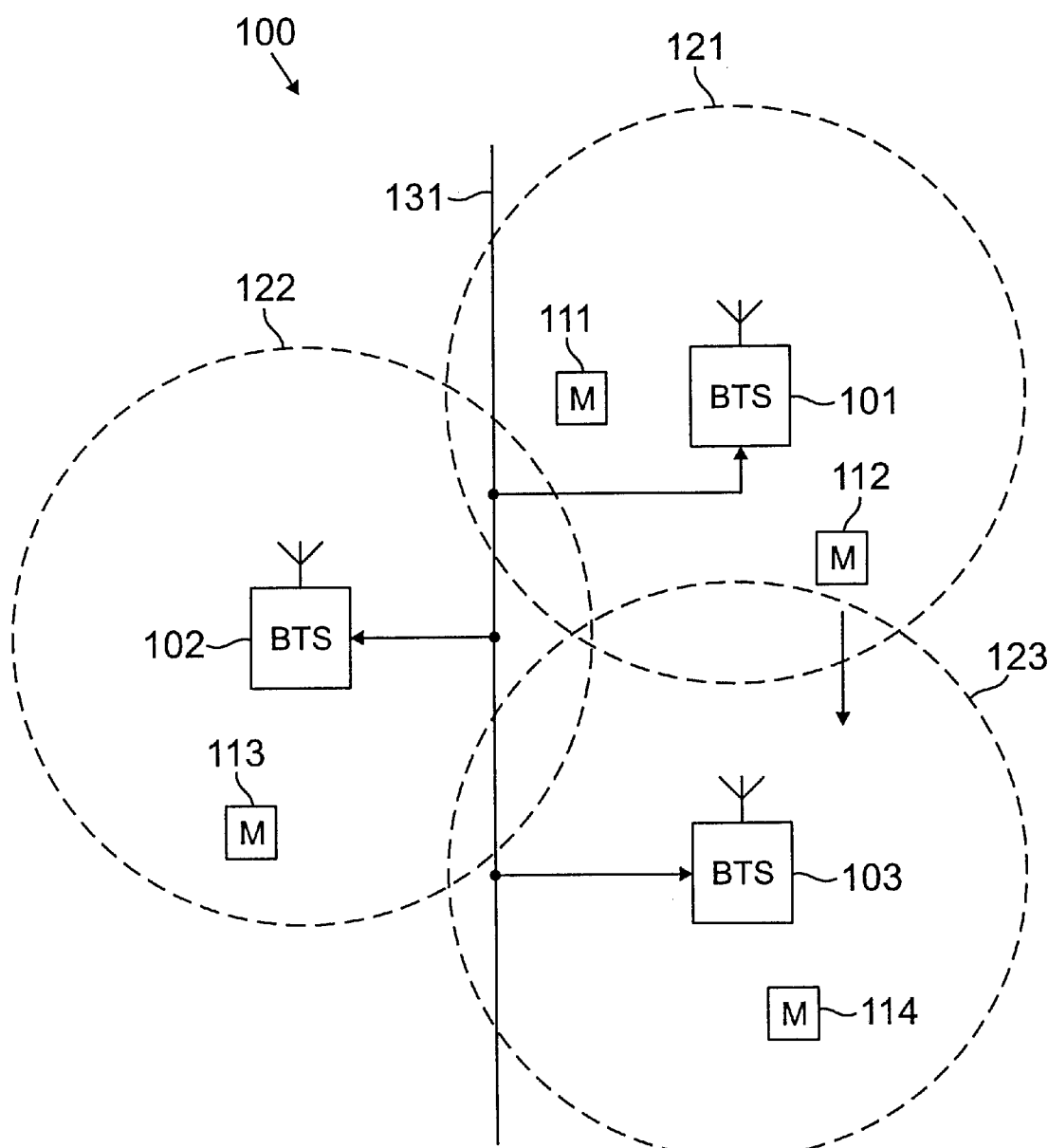
FIG. 1 illustrates an exemplary wireless network according to one embodiment of the present invention.

FIG. 1 illustrates an exemplary wireless network 100 according to one embodiment of the present invention. The wireless telephone network 100 comprises a plurality of cell sites 121–123, each containing one of the base transceiver stations, BTS 101, BTS 102, or BTS 103. Base transceiver stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BTS 101, BTS 102, and BTS 103 may comprise a base station controller (BSC), as well as conventional base transceiver station equipment. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers.

BTS 101, BTS 102 and BTS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one of BTS 101, BTS 102, or BTS 103 to MSC 140.

In the exemplary wireless network 100, MS 111 is located in cell site 121 and is in communication with BTS 101, MS 113 is located in cell site 122 and is in communication with BTS 102, and MS 114 is located in cell site 123 and is in communication with BTS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well know, the "handoff" procedure transfers control of a call from a first cell to a second cell. For example, if MS 112 is in communication with BTS 101 and senses that the signal from BTS 101 is becoming unacceptably weak, MS 112 may then switch to a BTS that has a stronger signal, such as the signal transmitted by BTS 103. MS 112 and BTS 103 establish a new communication link and a signal is sent to BTS 101 and the public telephone network to transfer the on-going voice, data, or control signals through BTS 103. The call is thereby seamlessly transferred from BTS 101 to BTS 103. An "idle" handoff is a handoff between cells of a mobile device that is communicating in the control or paging channel, rather than transmitting voice and/or data signals in the regular traffic channels.

Figure 2:
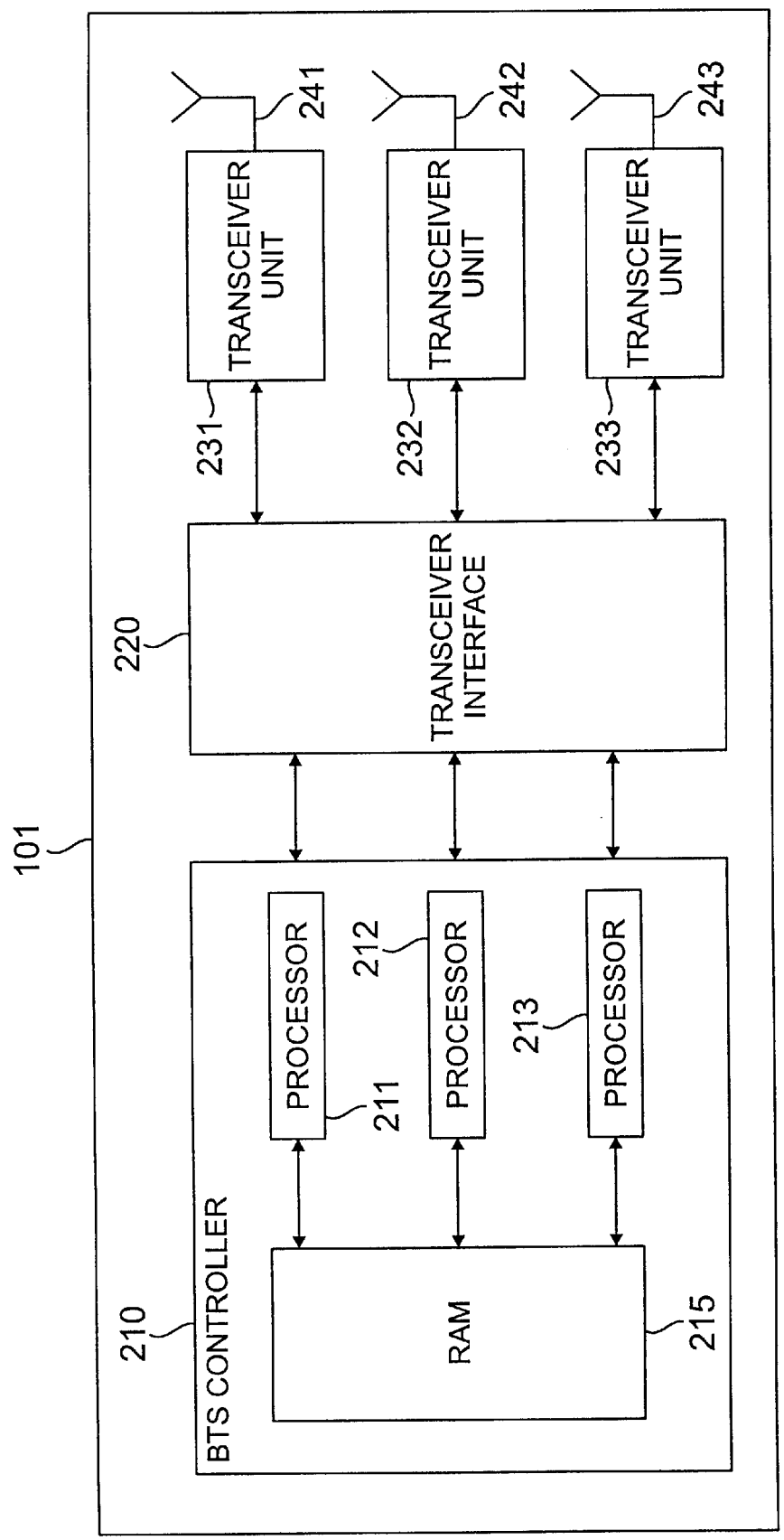
FIG. 2 illustrates an exemplary base transceiver station in accordance with one embodiment of the present invention.

FIG. 2 illustrates exemplary base transceiver station 101 in accordance with one embodiment of the present invention. Base transceiver station 101 comprises BTS controller 210, transceiver interface 220, transceiver units 231–233, and antennas 241–243. BTS controller 215 further comprises processors 211–213 and random access memory (RAM) 215. Processors 211–213 process inbound data and outbound data and buffer the inbound and outbound data in RAM 215. RAM 215 is also used to hold the application programs executed by processors 211–213. Although processors 211–213 are shown sharing a common RAM 215, this is by way of illustration only. RAM 215 may actually be several distinct RAM memories, such that each of processor 211–213 is coupled to its own dedicated RAM.

In the receive path, inbound RF signals transmitted by mobile stations in the coverage area of BTS 101 are picked by antennas 241, 242 and 243 and are demodulated by transceiver units 231, 232 and 233, respectively. The demodulated data are transferred by transceiver interface 220, which switches the inbound data to an appropriate one of processors 211, 212, or 213.

In the transmit path, processors 211–213 produce outbound data that are transferred to transceiver interface 220, which switches the outbound data to an appropriate one of transceiver units 231, 232, or 233. Transceiver units 231–233 modulate the outbound data and transmit the outbound RF signals to mobile stations in the coverage area of BTS 101.

Figure 3:
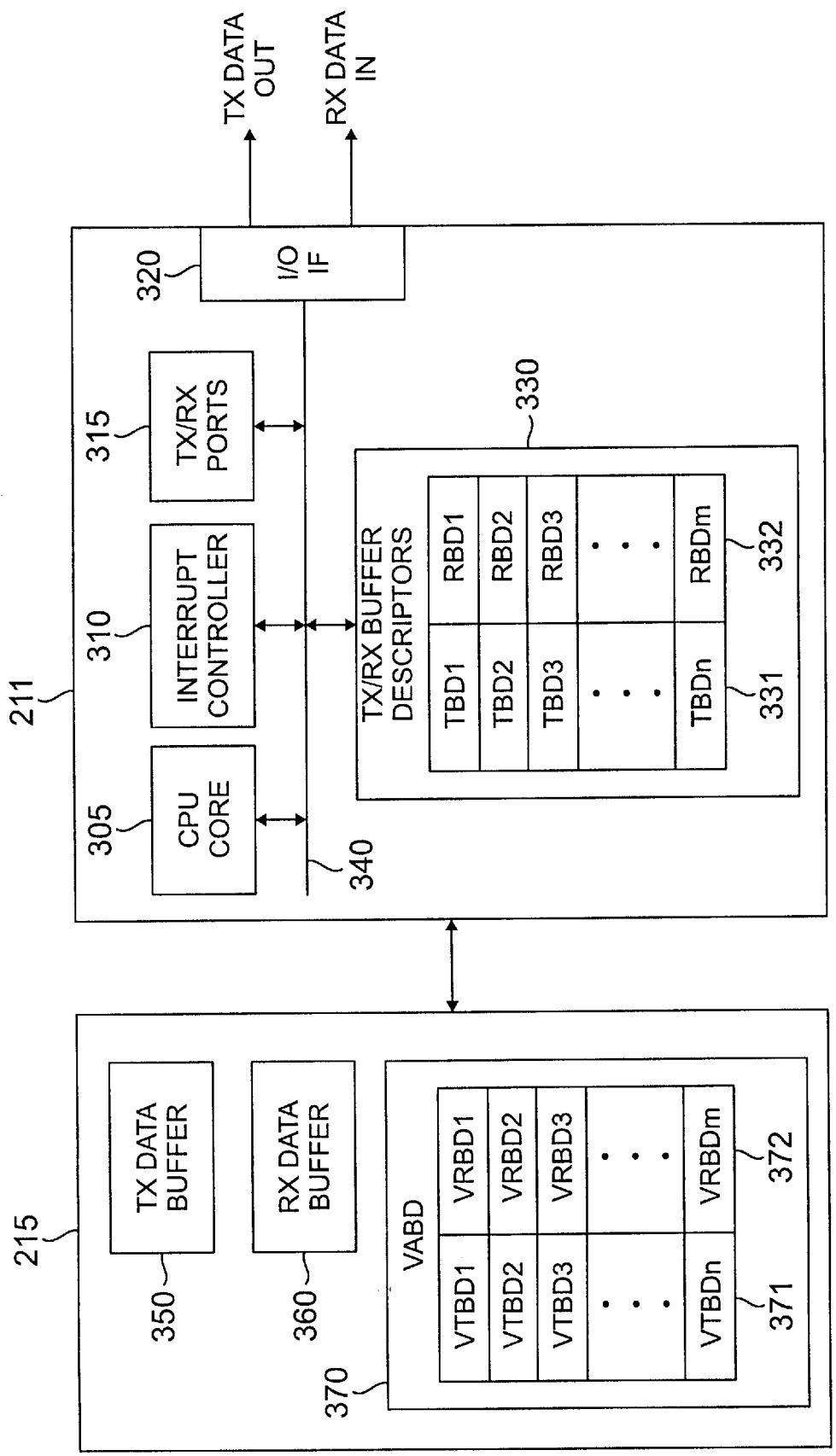
FIG. 3 illustrates a virtual array of buffer descriptors within a RAM and a processor in BTS controller in accordance with one embodiment of the present invention.

FIG. 3 illustrates exemplary virtual array of buffer descriptors 370 within RAM 215 and processor 211 in BTS controller 210 in accordance with one embodiment of the present invention. Exemplary processor 211 comprises a CPU core 305, interrupt controller 310, transmit/receive (TX/RX) ports 315, input/output (I/O) interface (IF) 320, and a group of registers that comprise transmit/receive (TX/RX) buffer descriptors 330. Data are transferred between these units via internal bus 340. RAM 215 comprises transmit (TX) data buffer 350, receive (TX) data buffer 360, and a virtual array of buffer descriptors (VABD) 370.

CPU core 305 comprises the fundamental arithmetic and logic circuits, data and instruction caches, and other sequencing logic that controls the overall operation of processor 211. Processor 211 receives demodulated incoming data (RX DATA IN) from transceiver interface 220 via I/O IF 320 and TX/RX ports 315. Processor 211 also transmits outbound data (TX DATA OUT) to transceiver interface 220 via I/O IF 320 and TX/RX ports 315. TX/RX ports 315 are configured by status and control bits, data length, and data address information stored in TX/RX buffer descriptors 320. This configuration information allows TX/RX ports 315 to transmit and receive according to different protocols. The actual transmit data and receive data are stored in transmit data buffer 350 and receive data buffer 360 in RAM 215.

The allocation of TX/RX buffer descriptors 330 between TX/RX ports 315 may be user defined. Thus, TX/RX buffer descriptors 330 may be logically subdivided into transmit buffer descriptors table 331 and receive buffer descriptors table 332. The transmit buffer descriptors are arbitrarily labeled "TBD1" through "TBDn" and the receive buffer descriptors are arbitrarily labeled "RBD1" through "RBDm," where the indexes "n" and "m" may or may not be equal. Each of TBD1–TBDn points to a location in transmit data buffer 350 where outbound data are stored. Each of RBD1–RBDn points to a location in receive data buffer 360 where inbound data are to be stored.

If the hardware receive buffer descriptors, RBD1–RBDm, are filled, incoming data cannot be received and an error is recorded. Additional incoming data is lost as long as the hardware receive buffer descriptors stay in this state. A buffer descriptor overflow error occurs and an error counter is incremented. The error may be detected by an interrupt service routine executed by interrupt controller 310, or by a polling application. The interrupt controller 310 or the polling application reports the error to a fault management system, and moves the contents of RBD1–RBDm to virtual array of buffer descriptors (VABD) 370 in RAM 215.

VABD 370 contains data structures similar to TX/RX buffer descriptors in processor 211. VABD 370 is logically subdivided into virtual transmit buffer descriptors table 371 and virtual receive buffer descriptors table 372. The virtual transmit buffer descriptors are arbitrarily labeled as "VTBD1" through "VTBDn" and the virtual receive buffer descriptors are arbitrarily labeled "VRBD1" through "VRBDm," where the indexes "n" and "m" may or may not be equal. Each of VTBD1–VTBDn points to a location in transmit data buffer 350 where outbound data are stored. Each of VRBD1–VRBDn points to a location in receive data buffer 360 where inbound data are to be stored.

Figure 4:
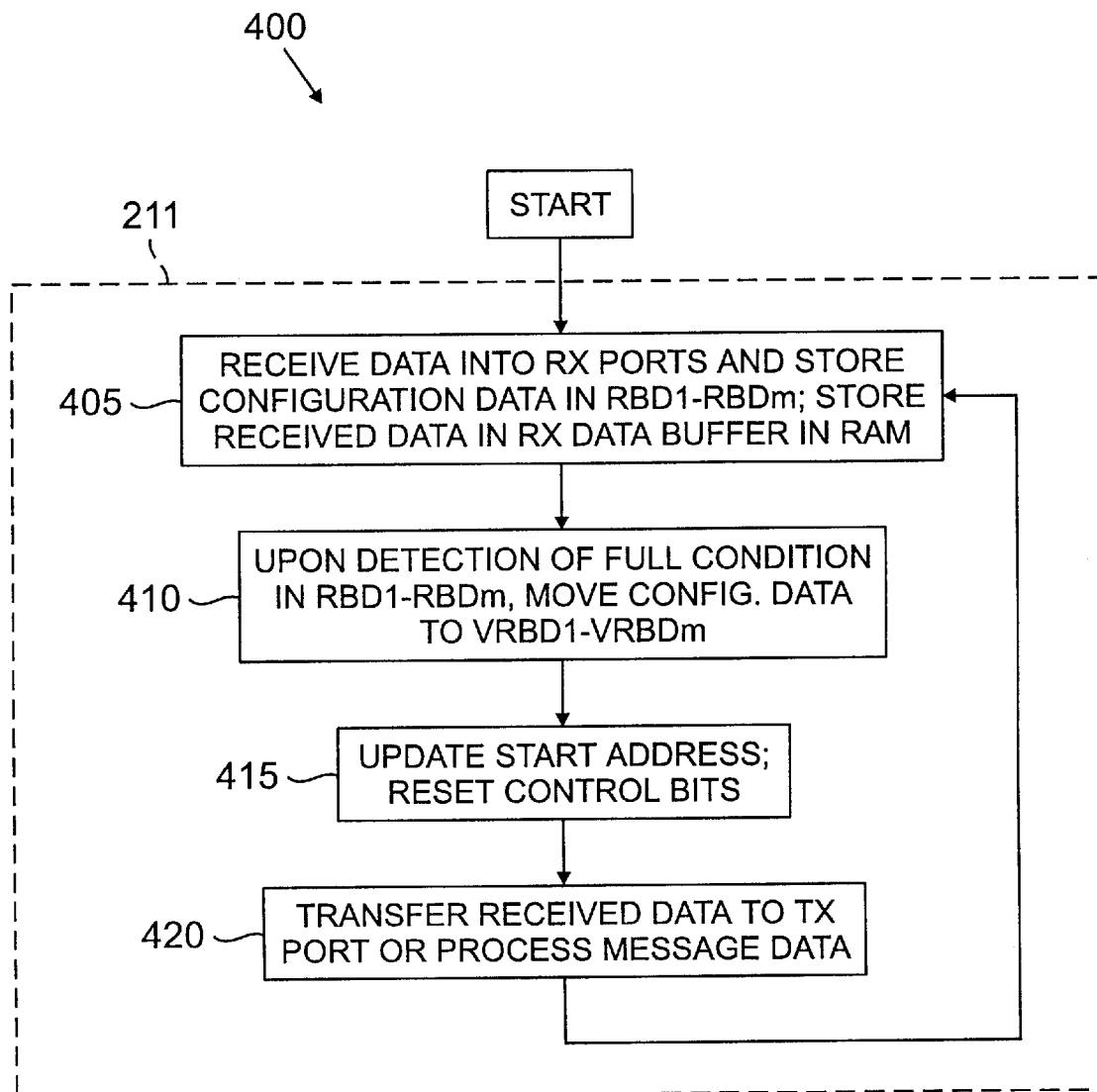
FIG. 4 is a flow diagram illustrating a data receiving operation of a BTS controller containing a virtual array of buffer descriptors in accordance with one embodiment of the present invention.

FIG. 4 is a flow diagram 400 illustrating a data receiving operation of BTS controller 210 and virtual array of buffer descriptors 370 in accordance with one embodiment of the present invention. In the ordinary course of operation, the receive side of one of TX/RX ports 315 is enabled and the RX port accesses a corresponding one of RBD1–RBDn, such as RBD2 for example, in TX/RX buffer descriptors 330. Depending on the values stored in RBD2, processor 211 may perform required protocol processing and store the resultant data in the location in receive data buffer 360 pointed to by RBD2 (process step 405).

At some point, an interrupt service routine or a polling application detects a full condition in RBD1–RBDm and moves the contents of RBD1–RBDm from TX/RX buffer descriptors 330 into VRBD1–VRBDm in VABD 370 in RAM 215 (process step 410). The address of the newly allocated memory replaces the starting address of the received data and the control bits are reset to allow incoming data into TX/RX buffer descriptors 330 (process step 415). Application software removes the address and length of the data packet from each of VRBD1–VRBDm and either transfers the data to a transmission port or processes the data if it is a message (process step 420).

If VRBD1–VRBDm are filled and RBD1–RBDm are also filled, another error indicating that virtual receive buffer descriptors table 372 is full occurs, and the fault management system is informed of this condition by the application software or interrupt service routine that discovers the full condition. Virtual receive buffer descriptors table 372 is emptied by the application software and the data from each of VRBD1–VRBDm is either routed or processed.

Figure 5:
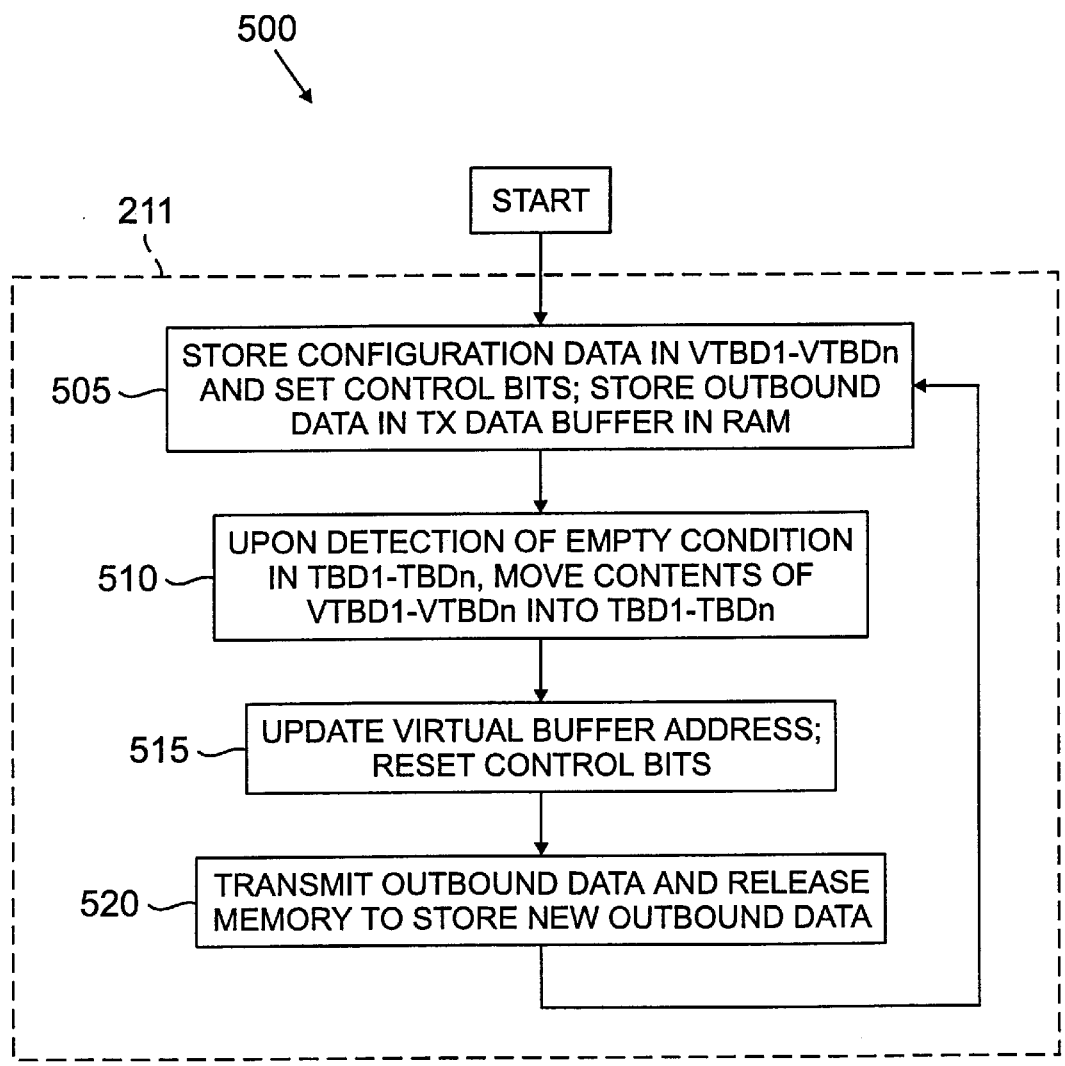
FIG. 5 is a flow diagram illustrating a data transmitting operation of a BTS controller containing a virtual array of buffer descriptors in accordance with one embodiment of the present invention.

FIG. 5 is a flow diagram 400 illustrating a data transmitting operation of BTS controller 210 and VABD 370 in accordance with one embodiment of the present invention. In the ordinary course of operation, the transmit side of one of TX/RX ports 315 is enabled and the TX port accesses a corresponding one of VTBD1–VRBDn, such as VTBD2 for example, in VABD 370 (process step 505). This may be done by application software that places outbound data in VTBD2 from either a receiver port in RX/TX ports 315 or from any other data generating source in BTS 101. The application software or other data source fills each of VTBD1–VTBDn and sets the proper control bits.

At some point, a timer function, a polling application, or an interrupt service routine that detects an empty condition in TBD1–TBDn, moves the contents of VTBD1–VTBDn from VABD 370 in RAM 215 into TBD1–TBDn in TX/RX buffer descriptors 330 in processor 211 (process step 510). The addresses of VTBD1–VTBDn are cleared and control bits are reset to allow new outbound data to be stored in VTBD1–VTBDn. The control bits of TBD1–TBDn are then set to start transmission (process step 515).

If VTBD1–VTBDn are filled before the interrupt service routine responding moves the contents of VTBD1–VTBDn into TBD1–TBDn, then an error is returned to any application that attempts to add more buffer descriptors to virtual transmit buffer descriptors table 371. The application will increment an error counter indicting a buffer descriptor "under run" condition. When one of TBD1–TBDn completes the transmission of outbound data, the memory used by the outbound data is released by the interrupt service routine (process step 520).

The present invention uses a software mechanism to expand processor capabilities that are now served handled exclusively by hardware. A virtual array of buffer descriptors may be implemented in any processor that uses a hardware memory-mapped array of buffer descriptors. The present invention increases the performance of any telecommunication equipment in which it is implemented. The result is to improve call traffic throughput, allowing the equipment to handle more calls than it could otherwise handle without the disclosed invention.

In a preferred embodiment of the present invention, multiple virtual arrays of buffer descriptors are implemented in order to allow increased prioritization of the transmission of data types. In telecommunications, one type of data transmission frequently has a higher priority than other types of data transmissions. For example, data containing an encoded voice signal requires delivery more promptly than a message regarding some routine system status information, though both of these data types can be created at the same time. Data types can be prioritized by logically subdividing the transmit VABD into a high-priority transmit VABD and a low-priority transmit VABD and by subdividing the receive VABD into a high-priority receive VABD and a low-priority receive VABD.

Communications processors incorporating hardware buffer descriptors, such as processors 211–213 described above, are well known in the art. For example, the Motorola MPC860 PowerQUICC™ processor is one such processor. Additional details regarding the Motorola MPC860 PowerQUICC™ processor are contained in the "MPC860 PowerQUICC™ User's Manual," Motorola, Inc., 1996, which is hereby incorporated by reference into the present disclosure as if fully set forth herein. The MPC860 PowerQUICC™ User's Manual may be obtained at the web site of Motorola, Inc.

Although the present invention has been described in detail, those skilled in the art should understand that they can make various changes, substitutions and alterations herein without departing from the spirit and scope of the invention in its broadest form.

What is claimed is:

1. For use in a communications network, a communications controller capable of transmitting outbound data to a receiving node and receiving incoming data from a transmitting node comprising:

a processor comprising:
a plurality of transmit buffer descriptors, each of said plurality of transmit buffer descriptors comprising at least one register capable of storing transmit configuration information used by said processor to control a transmission of said outbound data; and
a plurality of receive buffer descriptors, each of said plurality of receive buffer descriptors comprising at least one register capable of storing receive configuration information used by said processor to control a reception of said incoming data; and
a memory coupled to said processor and capable of storing said transmit configuration information in a virtual transmit buffer descriptors array and storing said receive configuration information in a virtual receive buffer descriptors array, wherein said processor transfers said receive configuration information from at least one of said plurality of receive buffer descriptors to said virtual receive buffer descriptors array when said plurality of receive buffer descriptors are full.

2. The communications controller set forth in claim 1 wherein said processor transfers said transmit configuration information from said virtual transmit buffer descriptors array to at least one of said plurality of transmit buffer descriptors when said plurality of transmit buffer descriptors are available.

3. The communications controller set forth in claim 1 wherein said processor further comprises a plurality of receiver ports capable of receiving said incoming data.

4. The communications controller set forth in claim 3 wherein said processor uses said receive configuration data to control an operation of at least one of said plurality of receiver ports.

5. The communications controller set forth in claim 1 wherein said processor further comprises a plurality of transmitter ports capable of transmitting said outbound data.

6. The communications controller set forth in claim 5 wherein said processor uses said transmit configuration data to control an operation of at least one of said plurality of transmit ports.

7. The communications controller set forth in claim 1 wherein said virtual transmit buffer descriptors array comprises a high priority virtual transmit buffer descriptors array capable of storing transmit configuration data associated with high priority outbound data and a low priority virtual transmit buffer descriptors array capable of storing transmit configuration data associated with low priority outbound data.

8. The communications controller set forth in claim 1 wherein said virtual receive buffer descriptors array comprises a high priority virtual receive buffer descriptors array capable of storing receive configuration data associated with high priority incoming data and a low priority virtual receive buffer descriptors array capable of storing receive configuration data associated with low priority incoming data.

9. For use in a wireless network, a base transceiver station (BTS) capable of transmitting outbound data to a mobile station and receiving incoming data from said mobile station, said base transceiver station comprising:

a plurality of transceivers capable of transmitting said outbound data and receiving said incoming data;
a BTS controller coupled to said plurality of transceivers comprising:

a processor comprising:
a plurality of transmit buffer descriptors, each of said plurality of transmit buffer descriptors comprising at least one register capable of storing transmit configuration information used by said processor to control a transmission of said outbound data; and
a plurality of receive buffer descriptors, each of said plurality of receive buffer descriptors comprising at least one register capable of storing receive configuration information used by said processor to control a reception of said incoming data; and
a memory coupled to said processor and capable of storing said transmit configuration information in a virtual transmit buffer descriptors array and storing said receive configuration information in a virtual receive buffer descriptors array, wherein said processor transfers said receive configuration information from at least one of said plurality of receive buffer descriptors to said virtual receive buffer descriptors array when said plurality of receive buffer descriptors are full.

10. The base transceiver station set forth in claim 9 wherein said processor transfers said transmit configuration information from said virtual transmit buffer descriptors array to at least one of said plurality of transmit buffer descriptors when said plurality of transmit buffer descriptors are available.

11. The base transceiver station set forth in claim 9 wherein said processor further comprises a plurality of receiver ports capable of receiving said incoming data.

12. The base transceiver station set forth in claim 11 wherein said processor uses said receive configuration data to control an operation of at least one of said plurality of receiver ports.

13. The base transceiver station set forth in claim 9 wherein said processor further comprises a plurality of transmitter ports capable of transmitting said outbound data.

14. The base transceiver station set forth in claim 13 wherein said processor uses said transmit configuration data to control an operation of at least one of said plurality of transmit ports.

15. The base transceiver station set forth in claim 9 wherein said virtual transmit buffer descriptors array comprises a high priority virtual transmit buffer descriptors array capable of storing transmit configuration data associated with high priority outbound data and a low priority virtual transmit buffer descriptors array capable of storing transmit configuration data associated with low priority outbound data.

16. The base transceiver station set forth in claim 9 wherein said virtual receive buffer descriptors array comprises a high priority virtual receive buffer descriptors array capable of storing receive configuration data associated with high priority incoming data and a low priority virtual receive buffer descriptors array capable of storing receive configuration data associated with low priority incoming data.

17. For use in a communications processor capable of transmitting outbound data to a receiving node and receiving incoming data from a transmitting node, the method comprising the steps of:

storing transmit configuration information used by the processor to control a transmission of the outbound data in a plurality of transmit buffer descriptors in the processor, each of the plurality of transmit buffer descriptors comprising a data register; and
storing receive configuration information used by the processor to control a reception of the incoming data in a plurality of receive buffer descriptors, each of the plurality of receive buffer descriptors comprising a data register; and when the plurality of receive buffer descriptors are full, transferring the receive configuration information from at least one of the plurality of receive buffer descriptors to a virtual receive buffer descriptors array disposed in a memory coupled to the processor.

18. The method set forth in claim 17 wherein the virtual receive buffer descriptors array comprises a high priority virtual receive buffer descriptors array capable of storing receive configuration data associated with high priority incoming data and a low priority virtual receive buffer descriptors array capable of storing receive configuration data associated with low priority incoming data.

19. The method set forth in claim 17 including the further step of transferring the transmit configuration information from a virtual transmit descriptors array disposed in the memory to at least one of the plurality of transmit buffer descriptors when the plurality of transmit buffer descriptors are available.

20. The method set forth in claim 19 wherein the virtual transmit buffer descriptors array comprises a high priority virtual transmit buffer descriptors array capable of storing transmit configuration data associated with high priority outbound data and a low priority virtual transmit buffer descriptors array capable of storing transmit configuration data associated with low priority outbound data.

* * * * *